(12) United States Patent
Shiotani et al.

(10) Patent No.: US 10,300,737 B2
(45) Date of Patent: May 28, 2019

(54) BICYCLE RIM

(71) Applicant: Shimano Inc., Sakai, Osaka (JP)

(72) Inventors: Yukinobu Shiotani, Osaka (JP);
Takanori Kanehisa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/358,632

(22) Filed: Nov. 22, 2016

(65) Prior Publication Data

US 2017/0072738 A1    Mar. 16, 2017

Related U.S. Application Data

(63) Continuation of application No. 13/900,797, filed on May 23, 2013, now Pat. No. 10,059,145.

(51) Int. Cl.

| *B60B 1/00* | (2006.01) |
| *B60B 21/00* | (2006.01) |
| *B60B 5/02* | (2006.01) |
| *B60B 7/00* | (2006.01) |
| *B60B 7/01* | (2006.01) |
| *B60B 21/02* | (2006.01) |
| *B60B 21/06* | (2006.01) |

(52) U.S. Cl.
CPC .............. *B60B 1/006* (2013.01); *B60B 1/003* (2013.01); *B60B 5/02* (2013.01); *B60B 7/0006* (2013.01); *B60B 7/01* (2013.01); *B60B 21/00* (2013.01); *B60B 21/025* (2013.01); *B60B 21/028* (2013.01); *B60B 21/062* (2013.01); *B60B 2310/30* (2013.01); *B60B 2360/10* (2013.01); *B60B 2360/104* (2013.01); *B60B 2360/3416* (2013.01); *B60B 2360/36* (2013.01); *B60B 2900/111* (2013.01); *B60B 2900/113* (2013.01); *B60B 2900/311* (2013.01)

(58) Field of Classification Search
CPC ........... B60B 1/06; B60B 21/062; B60B 7/01; B60B 2360/104; B60B 21/00; B60B 2900/113; B60B 2900/111
USPC .......................... 301/95.101, 95.102, 95.107
See application file for complete search history.

(56) References Cited

U.S. PATENT DOCUMENTS

| 2005/0067207 A1* | 3/2005 | Radtke ..................... B62M 6/45 180/223 |
| 2006/0273654 A1* | 12/2006 | Lien ........................ B60B 1/041 301/95.104 |
| 2007/0278848 A1* | 12/2007 | Chen ...................... B60B 1/041 301/58 |

(Continued)

FOREIGN PATENT DOCUMENTS

| DE | 10 2004 047 264 B4 | 1/2007 |
| DE | 10 2009 054 243 A1 | 5/2011 |

(Continued)

*Primary Examiner* — S. Joseph Morano
*Assistant Examiner* — Jean W Charleston
(74) *Attorney, Agent, or Firm* — Global IP Counselors, LLP

(57) ABSTRACT

A bicycle rim comprises a radially outer peripheral part, a radially inner peripheral part, at least one sidewall, and at least one cover member. The at least one side wall radially extends between the radially outer peripheral part and the radially inner peripheral part. The at least one side wall comprises at least one opening. The at least one cover member covers the at least one opening, and the at least one cover member comprises a metallic material.

14 Claims, 12 Drawing Sheets

(56) References Cited

U.S. PATENT DOCUMENTS

| | | | |
|---|---|---|---|
| 2008/0116655 A1* | 5/2008 | Pate | B62M 1/26 280/221 |
| 2012/0019047 A1* | 1/2012 | Niedermayer | B60B 3/02 301/5.1 |
| 2014/0346849 A1* | 11/2014 | Shiotani | B60B 21/00 301/95.102 |

FOREIGN PATENT DOCUMENTS

| | | |
|---|---|---|
| EP | 1 506 0882 A1 | 2/2005 |
| EP | 1 795 370 B1 | 3/2009 |
| JP | 2008-127001 A | 6/2008 |

* cited by examiner

BICYCLE RIM

CROSS-REFERENCE TO RELATED APPLICATIONS

This application is a continuation application of U.S. patent application Ser. No. 13/900,797 filed on May 23, 2013. The entire disclosure of U.S. patent application Ser. No. 13/900,797 is hereby incorporated herein by reference.

BACKGROUND

Field of the Invention

This invention generally relates to a bicycle rim. More specifically, the present invention relates to a bicycle rim that provides reinforcement therefor.

Background Information

There are many different types of bicycle wheels, which are currently available on the market. Most bicycle wheels have a hub portion, a plurality of spokes and an annular rim. The hub portion is attached to a part of the frame of the bicycle for relative rotation. The inner ends of the spokes are coupled to the hub portion and extend outwardly from the hub portion. The annular rim is coupled to the outer ends of the spokes and has an outer portion for supporting a pneumatic tire thereon.

Bicycle rims are continually undergoing design modifications to make them easier to manufacture, as well as stronger and lighter.

SUMMARY

Generally, the present disclosure is directed to various features of a bicycle rim that is provided with a radially outer peripheral part and a radially inner peripheral part. In view of the state of the known technology, one object proposed by this disclosure is to provide reinforcement for a bicycle rim.

In accordance with a first aspect of the present invention, a bicycle rim comprises a radially outer peripheral part, a radially inner peripheral part, at least one side wall, and at least one cover member. The at least one side wall radially extends between the radially outer peripheral part and the radially inner peripheral part. The at least one side wall comprises at least one opening, and the at least one cover member covers the at least one opening. The at least one cover member comprises a metallic material.

In accordance with a second aspect of the present invention, with the bicycle rim according to the first aspect, the at least one side wall comprises a non-metallic material.

In accordance with a third aspect of the present invention, with the bicycle rim according to the second aspect, the at least one side wall comprises a resin having carbon fibers or a fiber reinforced plastic.

In accordance with a fourth aspect of the present invention, with the bicycle rim according to the first aspect, the at least one side wall comprises an outer annular side portion, an inner annular side portion and at least one slanting member. The at least one opening is defined by the outer annular side portion, the inner annular side portion and the at least one slanting member.

In accordance with a fifth aspect of the present invention, with the bicycle rim according to the fourth aspect, the outer annular side portion, the inner annular side portion and the at least one slanting member are integrally formed as a single piece. Each of the outer annular side portion, the inner annular side portion and the at least one slanting member comprises a nonmetallic material.

In accordance with a sixth aspect of the present invention, with the bicycle rim according to the first aspect, the at least one opening includes a plurality of openings. The cover member covers the plurality of openings.

In accordance with a seventh aspect of the present invention, with the bicycle rim according to the sixth aspect, the cover member is an integral cover member that covers the plurality of openings.

In accordance with an eighth aspect of the present invention, with the bicycle rim according to the first aspect, the cover member is adhered to the at least one side wall by bonding or sealing.

In accordance with a ninth aspect of the present invention, with the bicycle rim according to the first aspect, the at least one cover member comprises aluminum.

In accordance with a tenth aspect of the present invention, with the bicycle rim according to the first aspect, the radially inner peripheral part comprises a plurality of spoke openings. The at least one opening is positioned radially outwardly from the plurality of spoke openings.

Other objects, features, aspects and advantages of the disclosed bicycle rim will become apparent to those skilled in the art from the following detailed description, which, taken in conjunction with the annexed drawings, discloses one embodiment of the bicycle operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
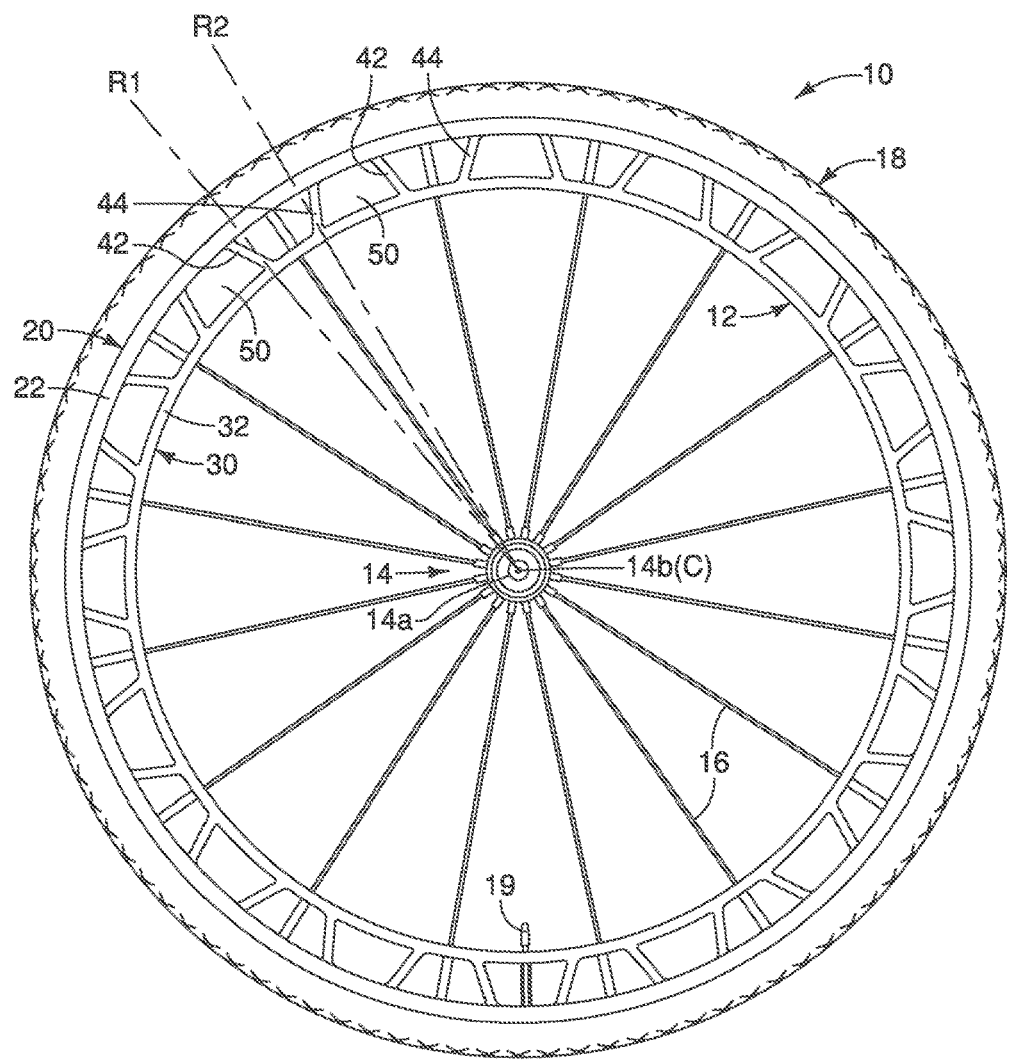
FIG. 1 is a side elevational view of a bicycle wheel that is equipped with a bicycle rim in accordance with a first illustrated embodiment.

Referring initially to FIG. 1, a bicycle wheel 10 is illustrated in accordance with a first embodiment. The bicycle wheel 10 basically includes a bicycle rim 12, a center hub 14, a plurality of spokes 16 and a pneumatic tire 18. As seen in FIG. 1, the bicycle rim 12 is an annular member that is designed for rotation about a center rotational axis C formed by a hub axle 14b of the center hub 14. The bicycle rim 12 will be explained below in more detail.

The center hub 14 includes a hub shell 14a that is rotatably mounted on the hub axle 14b via a pair of bearing units (not shown). The center hub 14 can be any type of bicycle hub that can be used with the bicycle rim 12. In other words, the precise construction of the center hub 14 is not important to the construction of the bicycle wheel 10. Thus, the center hub 14 will not be discussed and/or illustrated in further detail herein. Also, while a front hub is illustrated, the bicycle rim 12 can also be used with a rear hub to form a rear wheel as needed and/or desired.

The spokes 16 interconnect the bicycle rim 12 and the center hub 14 together in a conventional manner. The precise construction of the spokes 16 is not important to the construction of the bicycle wheel 10. The spokes 16 can be any type of spokes or other type of connecting device (e.g., a metal spoke, a composite spoke, a disc-shaped connecting member, etc.). Thus, the spokes 16 will not be discussed and/or illustrated in detail herein. In the first illustrated embodiment, the spokes 16 are metal, radial tension spokes. The spokes 16 connect the center hub 14 to the bicycle rim 12, with one or both ends of each of the spokes 16 being provided with a spoke nipple. In the first illustrated embodiment, for example, sixteen radial spokes 16 are coupled to the bicycle rim 12 at equally spaced circumferential locations as seen in FIG. 1. Alternatively, eight of the spokes 16 may extend from the center of the bicycle rim 12 to one side of the center hub 14, while the other eight spokes 16 may extend from the center of the bicycle rim 12 to the other side of the center hub 14. Of course, it will be apparent to those skilled in the art from this disclosure that the bicycle rim 12 could be modified to accommodate different spoking arrangements (e.g., all tangential spokes, some tangential spokes and some radial spokes, etc.) without departing from the scope of the present invention. Also, it will also be apparent to those skilled in the art from this disclosure that the bicycle rim 12 could be modified to accommodate fewer or more than sixteen spokes if needed and/or desired. In any case, the spokes 16 are preferably coupled to the bicycle rim 12 in a circumferentially spaced arrangement.

The pneumatic tire 18 is secured to the outer surface of the bicycle rim 12 in a conventional manner.

Referring now to FIGS. 1 to 5, the bicycle rim 12 will now be explained in detail. The bicycle rim 12 is formed of a suitable metallic material such as aluminum or an aluminum alloy. Of course, it will be apparent to those skilled in the art from this disclosure that the bicycle rim 12 can be formed of a fiber reinforced plastic (FRP) or a resin with carbon fibers as needed and/or desired.

Referring to FIG. 1, the bicycle rim 12 includes a radially outer peripheral part 20, a radially inner peripheral part 30, a plurality of first slanting members 42 (e.g., at least one first slanting member), and a plurality of intermediate members 50 (e.g., at least one intermediate member). In this illustrated embodiment, the bicycle rim 12 further includes a plurality of second slanting members 44 (e.g., at least one second slanting member). The radially outer peripheral part 20, the radially inner peripheral part 30, the first slanting members 42, the second slanting members 44, and the intermediate members 50 are integrally formed as a one piece, unitary member as discussed below in detail.

Figure 4:
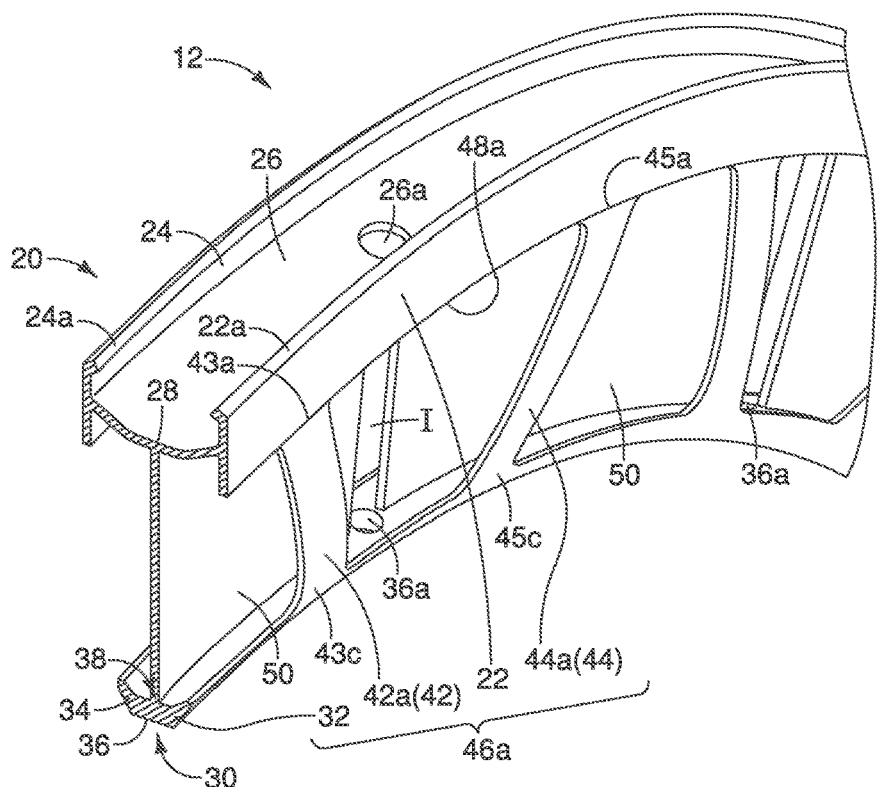
FIG. 4 is a further enlarged, partial perspective view of the bicycle rim illustrated in FIG. 3, illustrating a radial cross section of the bicycle rim.
Figure 5:
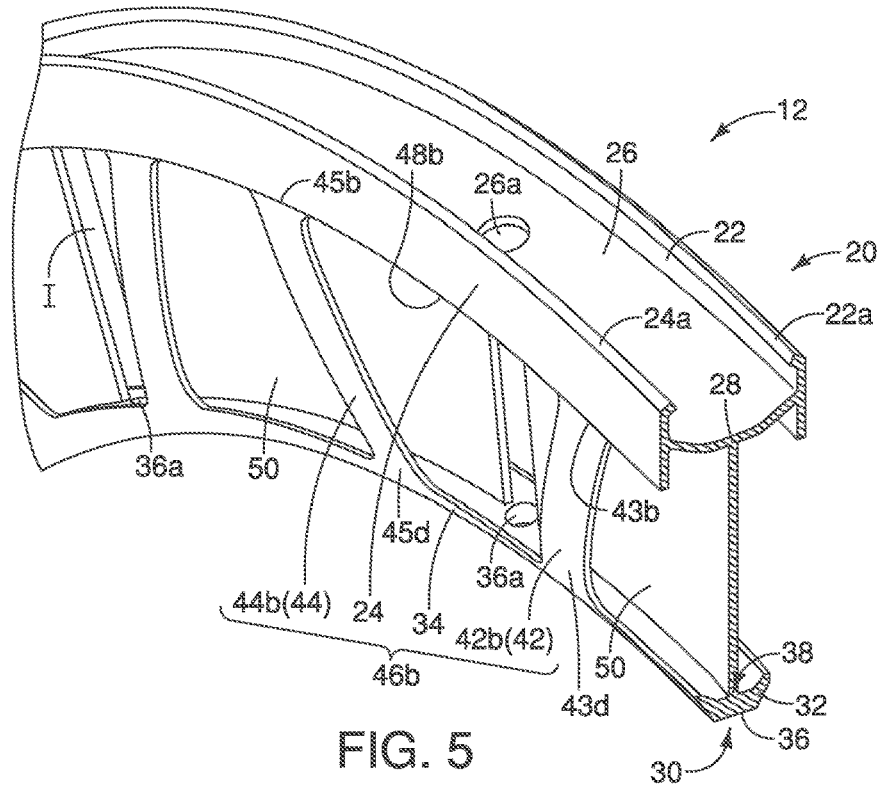
FIG. 5 is another further enlarged, partial perspective view of the bicycle rim illustrated in FIG. 3 as viewed from an arrow B of FIG. 3, illustrating the radial cross section of the bicycle rim.

The radially outer peripheral part 20 is configured to mount the pneumatic tire 18 (e.g., tire). As best shown in FIGS. 4 and 5, the radially outer peripheral part 20 has a first outer annular side portion 22, a second outer annular side portion 24, and an outer annular bridge 26 extending between the first and second outer annular side portions 22 and 24. The first and second outer annular side portions 22 and 24 have clincher portions 22a and 24a for retaining the pneumatic tire 18, respectively. The outer annular bridge 26 is concaved and transversely curved to form an annular tire engagement structure for attaching the pneumatic tire 18 thereon. Of course, it will be apparent to those skilled in the art from this disclosure that the first and second outer annular side portions 22 and 24 and the outer annular bridge 25 can be configured to accommodate a tubeless tire as needed and/or desired. The outer annular bridge 25 includes openings 25a for accessing and or mounting the spokes 15 in a conventional manner as needed and/or desired. Alternatively, the outer annular bridge 26 can be free of any opening except for an outer single air valve mounting opening, which is used to mount an air valve 19 (see FIG. 1). The outer annular bridge 26 further includes an outer axial middle portion 28 (e.g., axial middle portion of the radially outer peripheral part 20) to which the intermediate members 50 are connected. As shown in FIGS. 4 and 5, the outer axial middle portion 28 is positioned in the middle of the outer annular bridge 26 along in an axial direction A of the bicycle rim 12, which is along the center rotational axis C formed by the hub axle 14b of the center hub 14.

Figure 3:
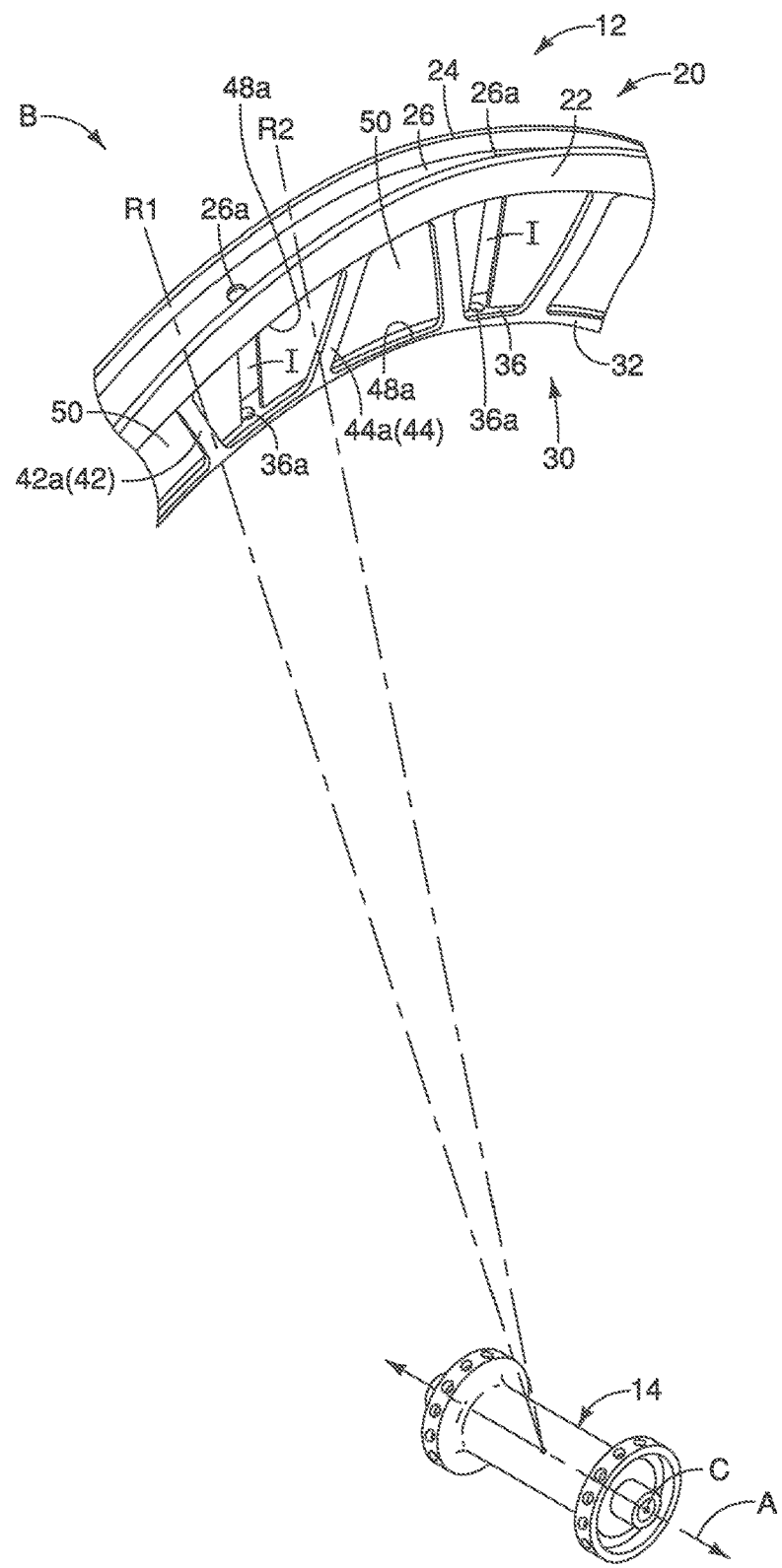
FIG. 3 is an enlarged, partial perspective view of the bicycle rim illustrated in FIG. 2.

The radially inner peripheral part 30 is configured to mount the spokes 16. As best shown in FIGS. 4 and 5, the radially inner peripheral part 30 includes a first inner annular side portion 32, a second inner annular side portion 34, and an inner annular bridge 36 extending between the first and second inner annular side portions 32 and 34. The inner annular bridge 36 has a plurality of spoke openings 36a that corresponds to the number of the spokes 16 and an inner single air valve mounting opening (not shown) for attaching the air valve 19 (see FIG. 1) in a conventional manner. The spoke openings 36a are disposed at equally spaced circumferential locations in the inner annular bridge 36. Since the configurations and arrangements of the spoke openings and the valve mounting opening for a bicycle rim are well known and vary depending on the purpose of the bicycle rim, the configurations and arrangements of the spoke openings and the valve mounting opening will not be discussed and/or illustrated herein. The inner annular bridge 36 further includes an inner axial middle portion 38 (e.g., axial middle portion of the radially inner peripheral part) to which the intermediate members 50 are connected. As shown in FIGS. 3 to 5, the inner axial middle portion 38 is positioned in the middle of the inner annular bridge 36 along in the axial direction A.

Figure 2:
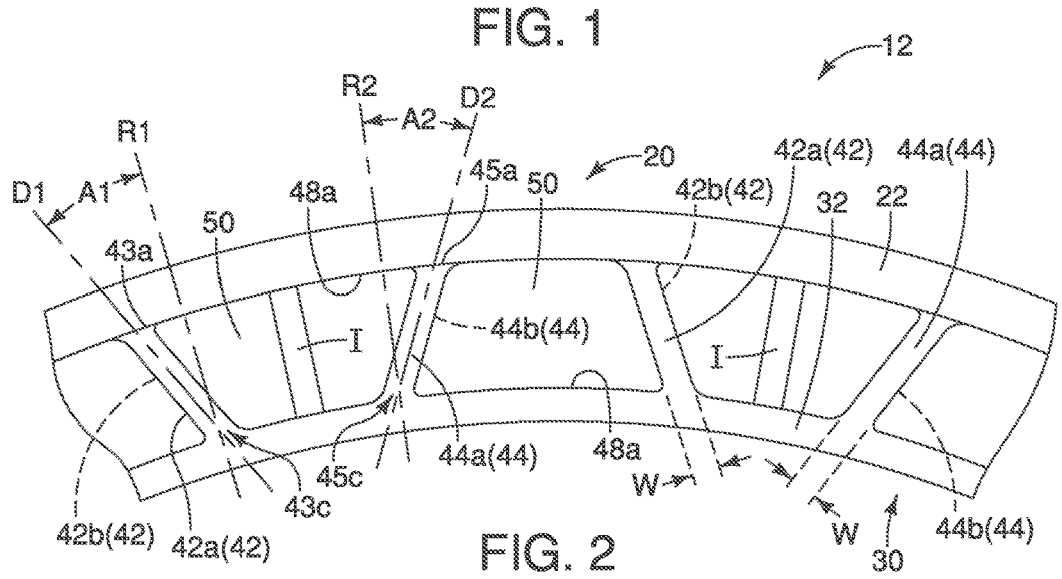
FIG. 2 is an enlarged, partial side elevational view of the bicycle rim illustrated in FIG. 1.

As seen in FIGS. 1 to 3, the first slanting members 42 radially extend between the radially outer peripheral part 20 and the radially inner peripheral part 30 in a first direction D1 slanted with respect to a radial direction R1 of the bicycle rim 12 as viewed in the axial direction A of the bicycle rim 12 (see FIG. 3).

As seen in FIGS. 2 to 5, in the illustrated embodiment, each of the first slanting members 42 includes a pair of first slanting members 42a and 42b. The first slanting members 42a and 42b are disposed opposite relative to each other with respect to the axial direction A of the bicycle rim 12. The first slanting members 42a and 42b are also aligned with respect to each other as viewed in the axial direction A of the bicycle rim 12.

In particular, as shown in FIGS. 2, 4 and 5, the first slanting members 42a and 42b have first outer ends 43a and 43b and first inner ends 43c and 43d, respectively. The first outer ends 43a and 43b contact the first outer annular side portion 22 and the second outer annular side portion 24, respectively, while the first inner ends 43c and 43d contact the first inner annular side portion 32 and the second inner annular side portion 34, respectively. As shown in FIGS. 2 and 3, the first slanting members 42a and 42b extend radially and straightly in the first direction D1, respectively, and are slanted in the counter-clockwise direction of FIG. 2 about the center rotational axis C at a first angle A1 with respect to the radial direction R1, respectively. Here, the radial direction R1 is defined as a radial direction that extends radially from the center rotational axis C through the first inner ends 43c, 43d as viewed in FIG. 2. In particular, the first slanting members 42a and 42b are slanted with respect to the radial direction R1 so that the first outer ends 43a and 43b connect the first outer annular side portion 22 and the second outer annular position 24, respectively, at locations circumferentially spaced from imaginary intersections of the radial direction R1 on the first and second outer annular positions 22 and 24 in the counter-clockwise direction in FIG. 2.

Again referring to FIGS. 2 to 5, the second slanting members 44 radially extend between the radially outer peripheral part 20 and the radially inner peripheral part 30 in a second direction D2 slanted with respect to a radial direction R2 of the bicycle rim 12 as viewed in the axial direction A of the bicycle rim 12, in particular, in the illustrated embodiment, each of the second slanting members 44 includes a pair of second slanting members 44a and 44b. The second slanting members 44a and 44b are disposed opposite relative to each other with respect to the axial direction A of the bicycle rim 12. The second slanting members 44a and 44b are also aligned with respect to each other as viewed in the axial direction A of the bicycle rim 12.

As shown in FIGS. 2, 4, and 5, the second slanting members 44a and 44b have second outer ends 45a and 45b and second inner ends 45c and 45d, respectively. The second outer ends 45a and 45b contact the first outer annular side portion 22 and the second outer annular side portion 24, respectively, while the second inner ends 45c and 45d contact the first inner annular side portion 32 and the second inner annular inner portion 34, respectively. As shown in FIGS. 2 and 3, the second slanting members 44a and 44b are extended in the second direction D2, respectively, and slanted in the clockwise direction of FIG. 2 about the center rotational axis C at a second angle A2 with respect to the radial direction R2, respectively. Here, the radial direction R2 is defined as a radial direction that extends radially from the center rotational axis C through the second inner ends 45c and 45d as viewed in FIG. 2. In particular, the second slanting members 44a and 44b are slanted with respect to the radial direction R2 so that the second outer ends 45a and 45b connect the first outer annular side portion 22 and the second outer annular position 24, respectively, at locations circumferentially spaced from imaginary intersections of the radial direction R2 on the first and second outer annular positions 22 and 24 in the clockwise direction in FIG. 2.

In this illustrated embodiment, the first angle A1 between the first direction D1 and the radial direction R1 and the second angle A2 between the second direction D2 and the radial direction R2 are substantially the same. However, of course, the bicycle rim 12 can be configured such that the first and second angles A1 and A2 are different from each other.

As shown in FIGS. 1 to 5, the second slanting members 44 are circumferentially disposed adjacent to the first slanting members 42. In particular, a plurality of the first slanting members 42a and 42b and a plurality of the second slanting members 44a and 42b are alternatively disposed around the entire circumference of the bicycle rim 12 at predetermined intervals.

As shown in FIGS. 1 to 5, the intermediate members 50 are disposed between the radially outer peripheral part 20 and the radially inner peripheral part 30. The intermediate members 50 reinforce the bicycle rim 12. In this illustrated embodiment, each of the intermediate members 50 has substantially a flat and square shape. The intermediate members 50 are disposed around the entire circumference of the bicycle rim 12 with intervals I to avoid the spoke openings 36a and the inner single air valve mounting opening (not shown).

In particular, the intermediate members 50 radially extend between the radially outer peripheral part 20 and the radially inner peripheral part 30. Also, the intermediate members 50 radially extend from the radially outer peripheral part 20. The intermediate members 50 radially extend between the radially outer peripheral part 20 and the radially inner peripheral part 30 so that the intermediate members 50 connect the radially outer peripheral part 20 with the radially inner peripheral part 30. In the illustrated embodiment, the intermediate members 50 radially extend between the outer axial middle portion 28 (e.g., axial middle portion) of the radially outer peripheral part 20 and the inner axial middle portion 38 (e.g., axial middle portion) of the radially inner peripheral part 30. In particular, as best shown in FIGS. 4 and 5, the intermediate members 50 radially extend between the radially outer peripheral part 20 and the radially inner peripheral part 30 so that the intermediate members 50 contact both of the outer axial middle portion 28 of the radially outer peripheral part 20 and the inner axial middle portion 38 of the radially inner peripheral part 30.

In this illustrated embodiment, the bicycle rim 12 can be also explained as follows. In particular, the bicycle rim 12 includes the radially outer peripheral part 20, the radially inner peripheral part 30, the intermediate members 50 (e.g., at least one intermediate wall), and a pair of a first side wall 46a and a second side wall 46b (e.g., at least one side wall). The first side wall 46a and the second side wall 46b radially extend between the radially outer peripheral part 20 and the radially inner peripheral part 30, and the first side wall 46a and the second wall 46b have a plurality of first openings 48a and second openings 48b (e.g., at least one opening).

More specifically, the first side wall 46a that includes the first openings 48a is formed of the first outer annular side portion 22, the first inner annular side portion 32, the first slanting members 42a, and the second slanting members 44a. Thus, the first openings 48a are defined by the first outer annular side portion 22, the first inner annular side portion 32, the first slanting members 42a, and the second slanting members 44a. Likewise, the second side wall 46b that includes the second openings 48b is formed of the second outer annular side portion 24, the second inner annular side portion 34, the first slanting members 42b, and the second slanting members 44b. Thus, the second openings 48b are defined by the second outer annular side portion 24, the second inner annular side portion 34, the first slanting members 42b, and the second slanting members 44b. As shown in FIG. 2, each of the first openings 48a and the second openings 48b has substantially a square shape with four corners.

Figure 6:
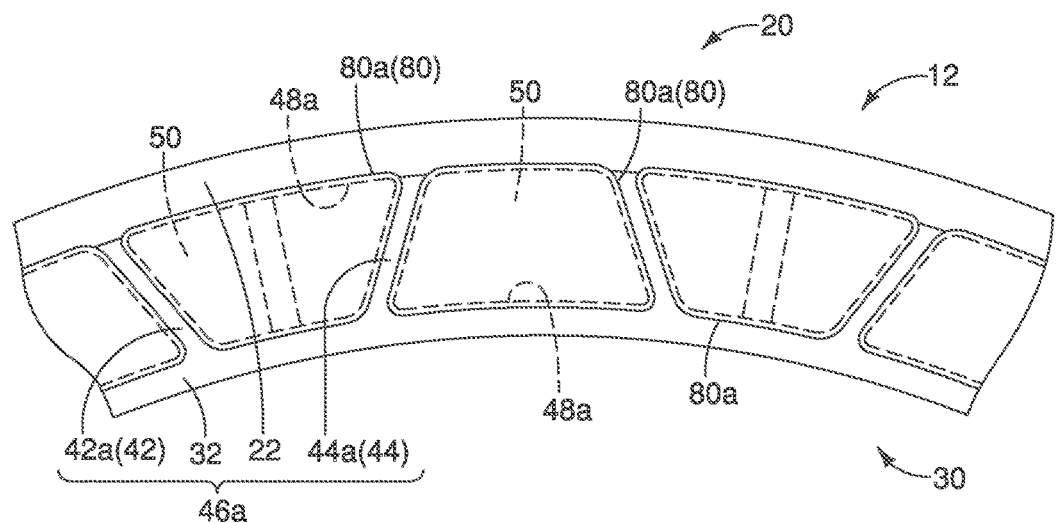
FIG. 6 is an enlarged, partial side elevational view of the bicycle rim illustrated in FIG. 2, in which film members cover openings defined by first slanting members and second slanted members.
Figure 7:
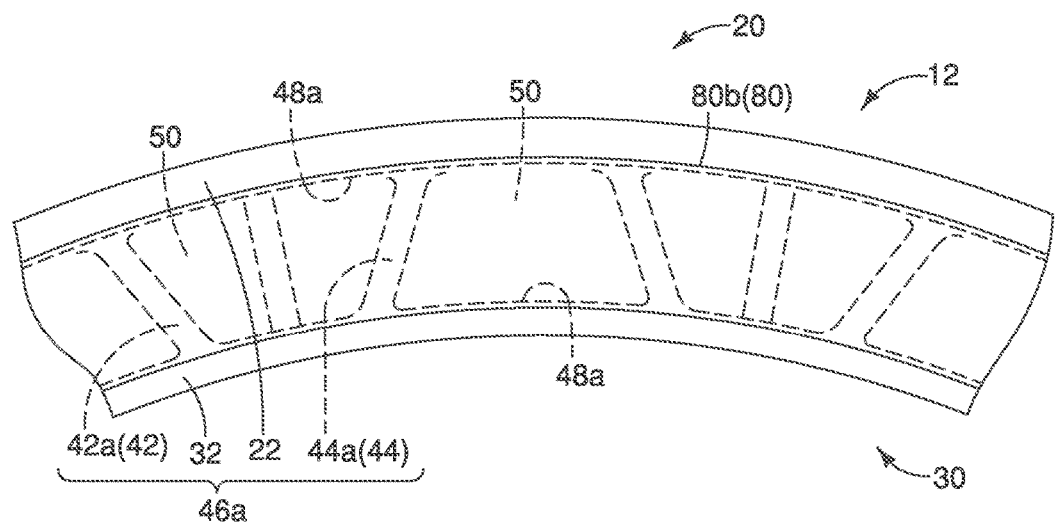
FIG. 7 is an enlarged, partial side elevational view of the bicycle rim illustrated in FIG. 2, in which one film member covers openings defined by the first slanting members and the second slanted members.

Referring to FIGS. 6 and 7, preferably or optionally, the bicycle rim 12 further includes at least one film member 80 (80a and 80b) (e.g., at least one film member) covering an area defined between the first slanting members 42 and the second slanting members 44. In other words, the bicycle rim 12 further includes the at least one film member 80 (80a and 80b) (e.g., film member) covering the first openings 48a and/or the second openings 43b (e.g., at least one opening). The film member 80 is a thin film that is constructed of materials such as plastic, carbon, or metal like aluminum. The film member 80 improves aerodynamic performance of the bicycle wheel 10.

As shown in FIG. 6, the bicycle rim 12 preferably includes a plurality of separate film members 80a each of which covers each of the first openings 48a and each of the second openings 48b (See FIG. 5). Of course, it will be apparent to those skilled in the art from this disclosure that only either the first openings 48a of the first side wall 46a or the second openings 48b of the second side wall 46b can be covered by the film members 80a.

Alternatively, as shown in FIG. 7, one integral film member 80b can cover a plurality of the first openings 48a or the second openings 48b. In particular, the bicycle rim 12 can has two of the integral film members 80b which cover all of the first openings 48a of the first side wall 46a and all of the second openings 48b of the second side wall 46b, respectively. Of course, it will be apparent to those skilled in the art from this disclosure that only either all of the first openings 48a of the first side wall 46a or all of the second openings 48b of the second side wall 46b can be covered by one of the integral film members 80b. Moreover, of course, it will be apparent to those skilled in the art from this disclosure that the film members 80a and 80b can cover only a part of the first openings 48a of the first side wall 46a and/or part of the second openings 48b of the second side wall 46b.

The film members 80a and 80b are adhered to the first side wall 46a and the second wide wall 46b (See FIG. 5) to cover the first openings 48a and the second openings 48b, respectively, by bonding, sealing, or other means known in the art. In the illustrated embodiment, the film members 80a and 80b cover the first openings 48a and the second openings 48b from axially outside of the bicycle rim 12, respectively. Alternatively, the film members 80a and 80b can cover the first openings 48a and the second openings 48b from axially inside of the bicycle rim 12, respectively.

Figure 8:
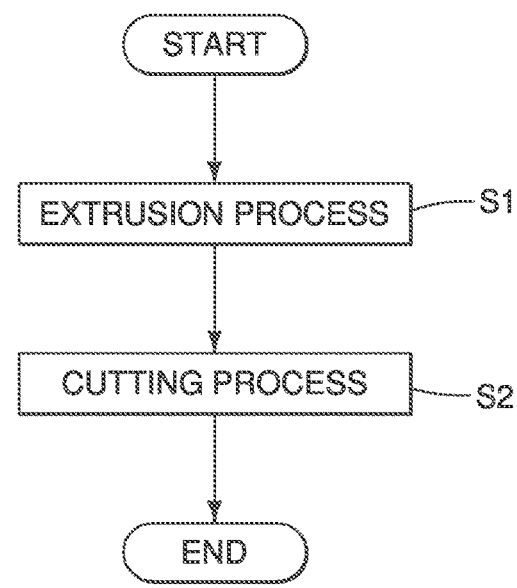
FIG. 8 is a flowchart showing a process for manufacturing the bicycle rim of the bicycle wheel illustrated in FIG. 1.
Figure 9:
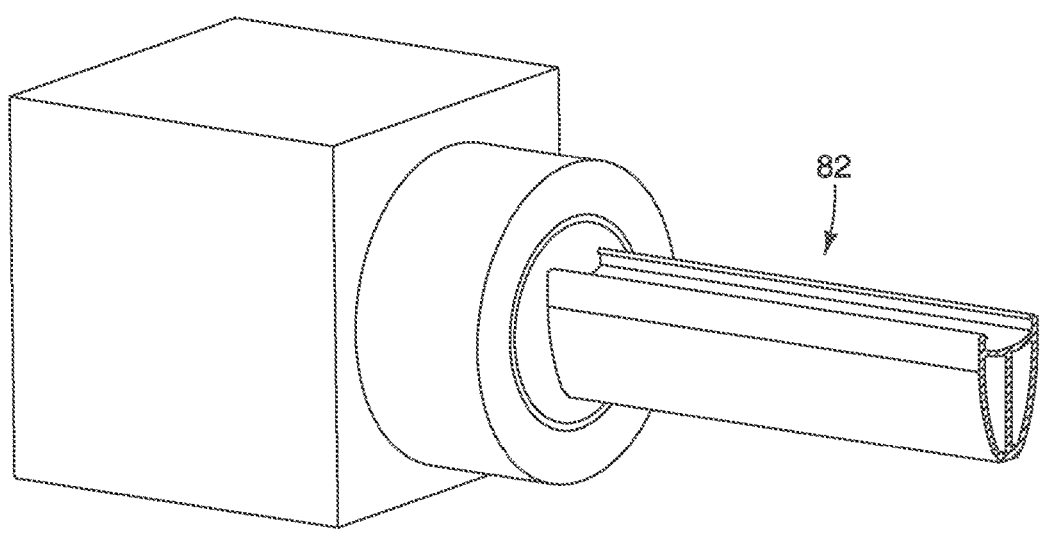
FIG. 9 is a schematic diagram illustrating an elongated metal member extruded for manufacturing the bicycle rim.
Figure 10:
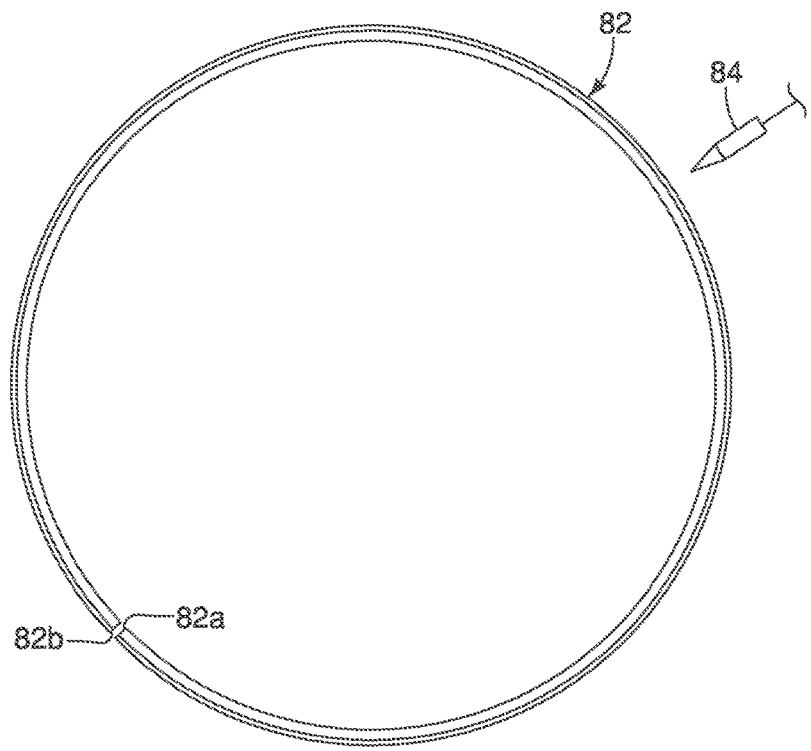
FIG. 10 is a side elevational view of the elongated metal member that was formed as illustrated in FIG. 11 after being bent into a hoop.

Referring now to FIGS. 8 to 10, a process of manufacturing the bicycle rim 12 for the bicycle wheel 10 of FIG. 1 will now be discussed. Initially, in Step S1, the bicycle rim 12 is manufactured by extrusion process. As discussed above, materials for the bicycle rim 12 can be, for example, aluminum or an aluminum alloy. As shown in FIG. 9, the material is extruded into an elongated metal member 82 with a basic overall shape of the bicycle rim 12 with no openings such as the first openings 48a and the second openings 48b and no intervals I for the intermediate members 50. Next, the elongated metal member 82 is cut to a desired predetermined length for manufacturing the bicycle rim 12 of a desired diameter. Then, the elongated metal member 82 is bent or rounded to form a hoop. After rounding the elongated metal member 82, the elongated metal member 82 is formed in a ring shape as shown in FIG. 10. Then, circumferential ends 82a and 82b of the elongated metal member 82 is joined together.

Next, the first openings 48a and the second openings 48b are formed after the extrusion process. In particular, in Step S2, the first openings 48a and the second openings 48b are formed by cutting process. Also, the intermediate member 50 (e.g., intermediate wall) is cut during the cutting process. In other words, the elongated metal member 82 is cut to form the intervals I of the intermediate member 50. The cutting process is performed with laser cutter. For example, referring again to FIG. 10, a laser cutting machine 84 is used, and a laser beam emitted the laser cutting machine 84 is absorbed into the elongated metal member 82 to form any openings including the first openings 48a and the second openings 48b, and the intervals I of the intermediate member 50. As a result, the bicycle rim 12 as shown in FIGS. 1 to 5 is obtained. Of course, it will be apparent to those skilled in the art from this disclosure that the cutting process is performed with other ways such as a mechanical forming operation known in the art as needed and/or desired. After the cutting process, the film members 80 are preferably adhered to both of the first side wall 46a and the second side wall 46b, or either the first side wall 46a or the second side wall 46b to cover the first openings 48a and/or the second openings 48b.

Figure 11:
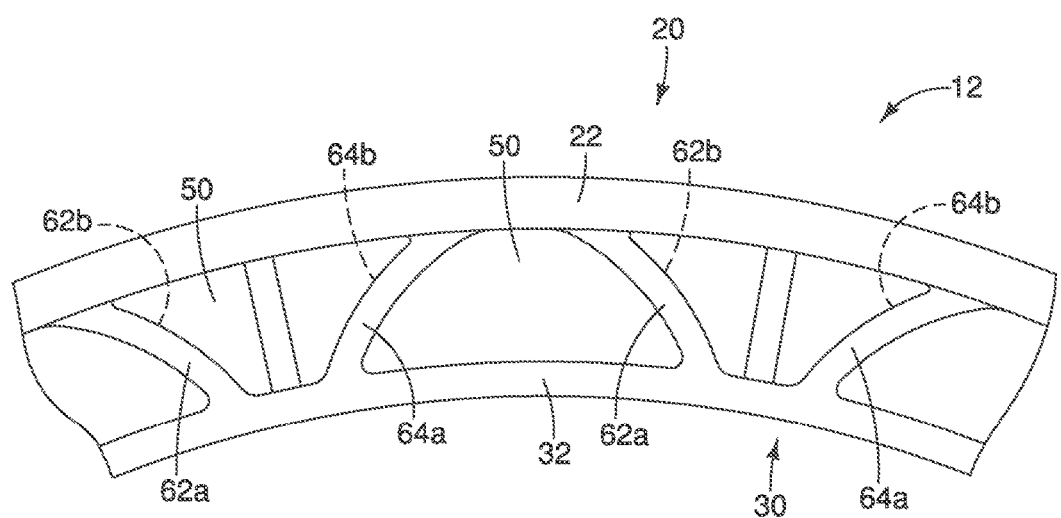
FIG. 11 is an enlarged, partial side elevational view of the bicycle rim illustrated in FIG. 1, in which each of the first slanting members have an arched shape.
Figure 12:
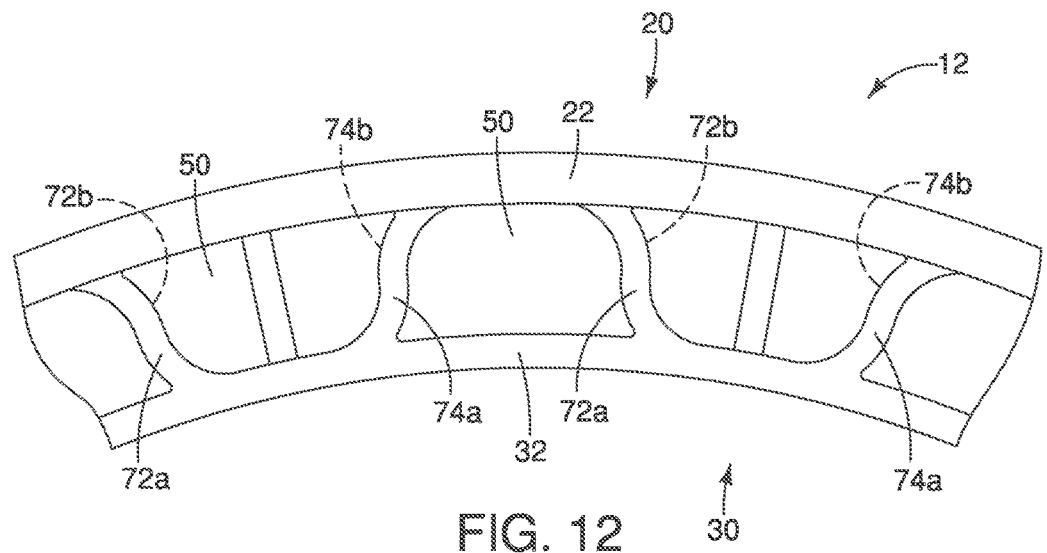
FIG. 12 is an enlarged, partial side elevational view of the bicycle rim illustrated in FIG. 1, in which each of the first slanting members have a wavy shape.

In this embodiment illustrated above, each of the first slanting members 42 and the second slanting members 44 has a straight shape as viewed from the front side of FIG. 2. However, it will be apparent to those skilled in the bicycle field from this disclosure that the first slanting members 42 and the second slanting members 44 can have various shapes, as needed and/or desired. For example, as shown in FIGS. 11 and 12, first slanting members 62a and 62b, and second slanting members 64a and 64b can have an arching shape or a wavy shape. In particular, each of the first slanting members 62a and 62b, and the second slanting members 64a and 64b can have an arching shape as viewed from the front side of FIG. 11. Also, each of the first slanting members 62a and 62b, and the second slanting members 62a and 62b can have a wavy shape as viewed from the front side of FIG. 12. The term "slant", "slanting", or "slanted", as used herein, encompasses not only straight/linear configurations but also arching/curving/wavy configurations as long as such configurations incline with respect to a baseline.

In the illustrated embodiment, each of the first slanting members 42 and the second slanting members 44 has a straight shape with the same lateral width W as viewed from the front side of FIG. 2. However, of course, it will be apparent to those skilled in the an from this disclosure that the lateral width W can be smaller or bigger, as needed and/or desired.

As explained above, the bicycle rim 12 has the intermediate members 50 radially extending between the radially outer peripheral part 20 and the radially inner peripheral part 30. Accordingly, with this arrangement, the bicycle rim 12 with improved reinforcement can be provided.

Second Embodiment

Figure 13:
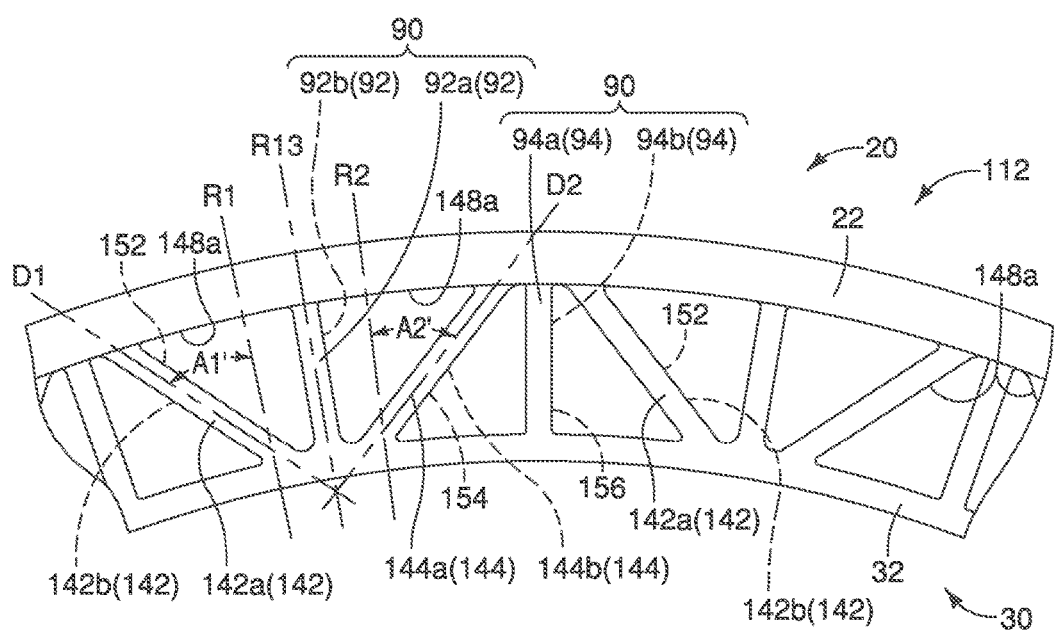
FIG. 13 is an enlarged, partial side elevational view of a bicycle rim in accordance with a second illustrated embodiment.
Figure 14:
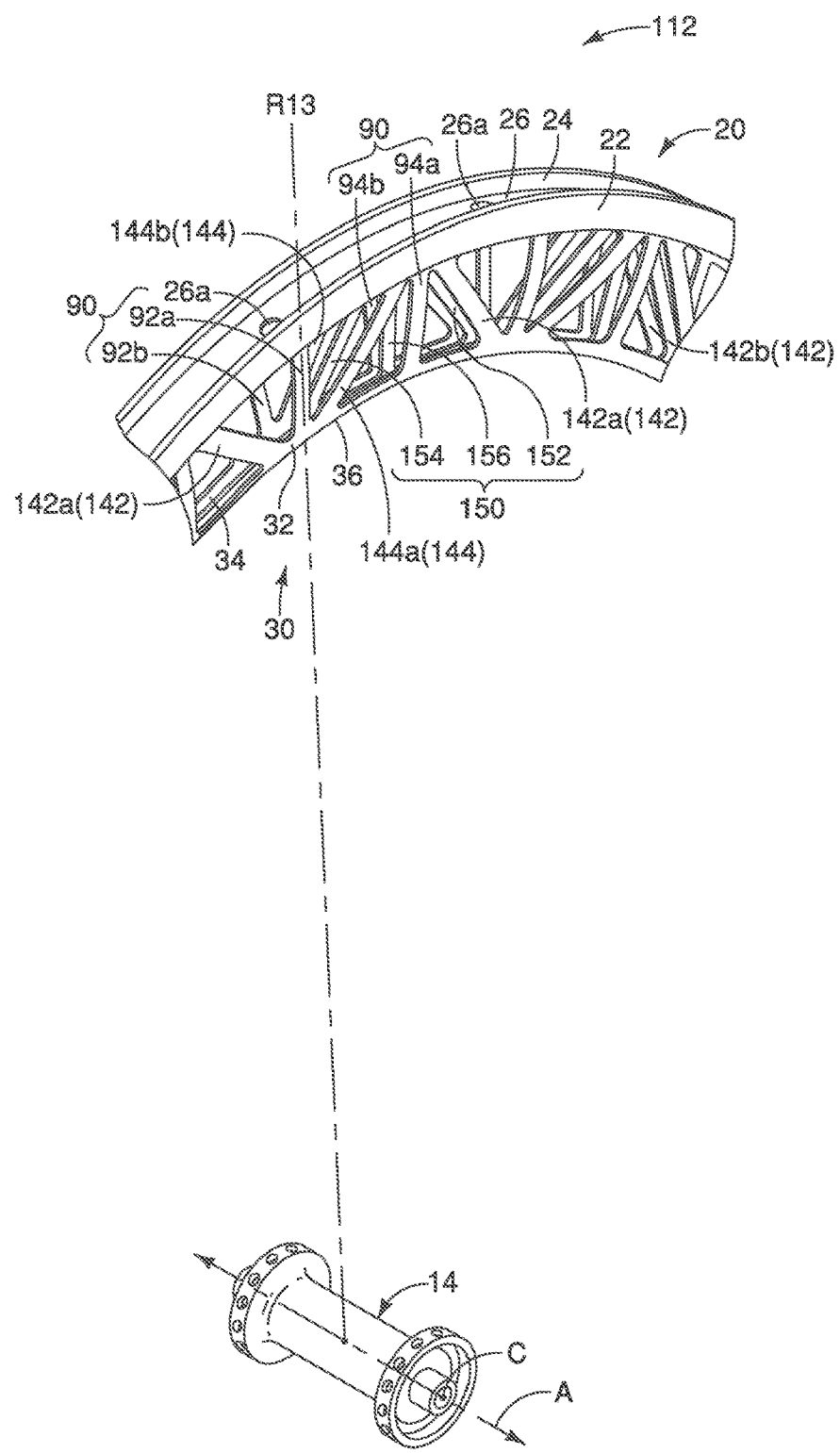
FIG. 14 is an enlarged, partial perspective view of the bicycle rim illustrated in FIG. 13.
Figure 15:
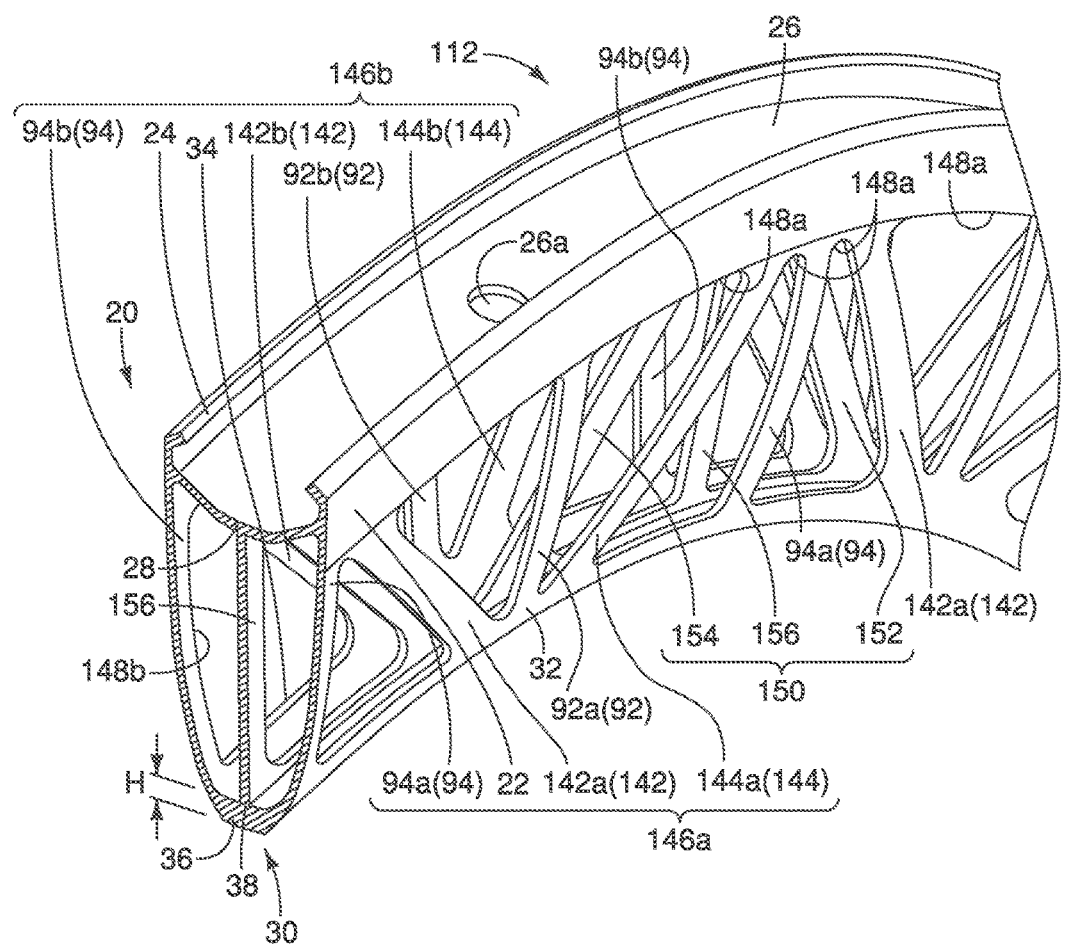
FIG. 15 is a further enlarged, partial perspective view of the bicycle rim illustrated in FIG. 13, illustrating a radial cross section of the bicycle rim.

Referring now to FIGS. 13 to 15, a bicycle rim 112 in accordance with a second embodiment will now be explained. The bicycle rim 112 is basically identical to the bicycle rim 12, except, for example, that bicycle rim 112 includes a plurality of straight members 90 and a plurality of intermediate members 150, as explained below.

In view of the similarity between the first and the second embodiments, the parts of the second embodiment that are identical to the parts of the first embodiment will be given the same reference numerals as the pans of the first embodiment. In any event, the descriptions of the parts of the second embodiment that are substantially identical to the parts of the first embodiment may be omitted for the sake of brevity. However, it will be apparent to those skilled in the art from this disclosure that the descriptions and illustrations of the first embodiment also apply to this second embodiment, except as discussed and/or illustrated herein.

The bicycle rim 112 includes the radially outer peripheral part 20, the radially inner peripheral part 30, a plurality of first slanting members 142 (e.g., at least one first slanting member), a plurality of second slanting members 144 (e.g., at least one second slanting members), a plurality of straight members 90 (at least one straight member), and a plurality of intermediate members 150 (at least one intermediate member). The radially outer peripheral part 20, the radially inner peripheral part 30, the first slanting members 142, the second slanting members 144, the straight members 90, and the intermediate members 150 are integrally formed as a one piece, unitary member.

In the illustrated embodiment, the first slanting members 142 are basically identical to the first slanting members 42 except for a first angle between the first direction D1 and the radial direction R1. Also, in the illustrated embodiment, the second slanting members 144 are basically identical to the second slanting members 44 except for a second angle between the second direction D2 and the radial direction R2. However, of course, these first and second angles can be the same as the corresponding angles of the first and second slanting members 42 and 44 of the first illustrated embodiment. In the illustrated embodiment, as shown in FIG. 13, a pair of first slanting members 142a and 142b is slanted in the counterclockwise direction of FIG. 13 about the center rotational axis C at a first angle A1' with respect to the radial direction R1 as viewed from the front side of FIG. 13, with the first angle A1' being greater than the first angel A1. Likewise, a pair of second slanting members 144a and 144b is slanted in the clockwise direction of FIG. 13 about the center rotational axis C at a second angle A2' with respect to the radial direction R2 as viewed from the front side of FIG. 13 with the second angle A2' being greater than the second angel A2. The further detailed description on the first slanting members 142 and the second slanting members 144 will be omitted for the sake of brevity.

As shown in FIGS. 13 and 14, the straight members 90 radially extend between the radially outer peripheral part 20 and the radially inner peripheral part 30 in a radial direction of the bicycle rim 112. Also, the straight members 90 are circumferentially disposed between the slanting members 142 and the second slanting members 144.

The straight members 90 include a pair of first straight members 92a and 92b (e.g., a pair of straight members). The first straight members 92a and 92b are disposed opposite relative to each other with respect to the axial direction A of the bicycle rim 112. Also, the first straight members 92a and 92b are aligned with respect to each other as viewed in the axial direction A of the bicycle rim 112.

In particular, as shown in FIGS. 13 and 14, the first straight members 92a and 92b radially and straightly extend in a radial direction R13 with respect to the center rotational axis C so that the first straight members 92a and 92b contact both of the radially outer peripheral part 20 and the radially inner peripheral part 30. Also, the first straight members 92a and 92b are circumferentially disposed between the first slanting members 142 and the second slanting members 144 that are circumferentially disposed adjacent to the first slanting member 142. More specifically, the first straight members 92a and 92b are circumferentially disposed between the first slanting members 142 and the second slanting members 144. In the illustrated embodiment, the first slanting members 142 are circumferentially disposed on the counter-clockwise side relative to the first straight members 92a and 92b while the second slanting members 144 are circumferentially disposed on the clockwise side relative to the first straight members 92a and 92b as viewed from the front side of FIG. 13.

As shown in FIGS. 13 and 14, the straight members 90 further include a pair of second straight members 94a and 94b. The second straight members 94a and 94b are basically identical to the first straight members 92a and 92b. The second straight members 94a and 94b are circumferentially disposed between the second slanting members 144 and the first slanting members 142. The second slanting members 144 are circumferentially disposed on the counterclockwise side relative to the second straight members 94a and 94b while the first slanting members 142 are circumferentially disposed on the clockwise side relative to the second straight members 94a and 94b as viewed from the front side of FIG. 13.

The intermediate members 150 are basically identical to the intermediate members 50 except that the intermediate members 150 are aligned with the first slanting members 142 as viewed in the axial direction A of the bicycle rim 112. In this illustrated second embodiment, the intermediate members 150 are further aligned with the second slanting members 144 and the straight members 90 as viewed in the axial direction A of the bicycle rim 112.

In particular, as shown in FIGS. 13 to 15, the intermediate members 150 have first intermediate portions 152, second intermediate portions 154, and third intermediate portions 156. The first intermediate portions 152 are slanted in the counter-clockwise direction at the first angle A1' with respect to the radial direction R1 of the bicycle rim 112 as viewed from the front side of FIG. 13. Accordingly, the first intermediate portions 152 are aligned with the first slanting members 142 as viewed in the axial direction A. The second intermediate portions 154 are slanted in the clockwise direction at the second angle A2' with respect to the radial direction R2 of the bicycle rim 112 as viewed from the front side of FIG. 113. Accordingly, the second intermediate portions 152 are aligned with the second slanting members 144 as viewed in the axial direction A. The third intermediate portions 156 radially extend in the radial direction of the bicycle rim 112, and are aligned with the straight slanting members 94a and 94b as viewed in the axial direction A. In this illustrated second embodiment, any intermediate portions are not disposed that are aligned with the first straight slanting members 92a and 92b as viewed in the axial direction A for providing the spoke openings 36a (see FIG. 3) and the inner single air valve mounting opening (not shown) (see FIG. 1).

In this illustrated second embodiment, the bicycle rim 112 can be also explained as follows. In particular, the bicycle rim 112 includes the radially outer peripheral part 20, the radially inner peripheral part 30, the intermediate members 150 intermediate wall), and a pair of a first side wall 146a and a second side wall 146b radially extending between the radially outer peripheral part 20 and the radially inner peripheral part 30. Also, the first side wall 146a and the second side wall 146b have a plurality of first openings 148a and a plurality of second openings 148b, respectively.

In particular, as best shown in FIG. 15, the first side wall 146a and the second side wall 146b are basically identical to the first side wall 46a and the second side wall 46b except that the first side wall 146a and the second side wall 146b are further formed of the straight members 90. Likewise, the first openings 148a and the second openings 148b are basically identical to the first openings 48a and the second openings 48b except that the first openings 146a and the second openings 148b are defined further by the straight members 90, and each of the first openings 148a and the second openings 148b has a triangle shape with three corners.

In particular, the first side wall 146a is formed of the first outer annular side portion 22, the first inner annular side portion 32, the first slanting members 142a, the second slanting members 144a, the first straight members 92a, and the second straight member 94a. Thus, the first openings 148a are defined by the first outer annular side portion 22, the first inner annular side portion 32, the first slanting members 142a or the second slanting members 144a, and the first straight members 92a or the second straight members 94a. Likewise, the second side wall 146b is formed of the second outer annular side portion 24, the second inner annular side portion 34, the first slanting members 142b, the second slanting members 144b, the first straight members 92b, and the second straight members 94b. Thus, the second openings 148b are defined by the second outer annular side portion 24, the second inner annular side portion 34, the first slanting members 142b or the second slanting members 144b, and the first straight members 92b or the second straight members 94b.

Figure 16:
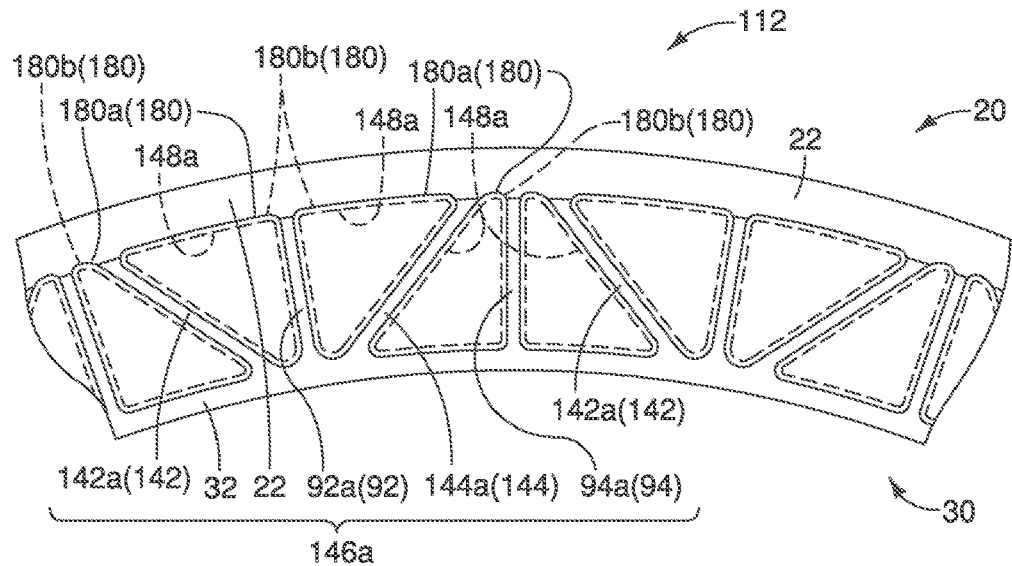
FIG. 16 is an enlarged, partial side elevational view of the bicycle rim illustrated in FIG. 13, in which film members cover openings defined by first slanting members, second slanted members, and straight members.

As shown in FIG. 16, the bicycle rim 112 preferably or optionally further includes at least one film member 180 (180a and 180b) (e.g., at least one film member) covering an area defined between the first slanting members 142 and the straight members 90, or between the second slanting members 144 and the straight members 90. In other words, the bicycle rim 112 further includes the at least one film member 180 (180a and 180b) (e.g., at least one film member) covering the first openings 148a of the side wall 146a and the second openings 148b of the side wall 146b (see FIG. 15). The at least one film member 180 is basically identical to the at least one film member 80 except for that the film member 180 covers the first openings 148a and the second openings 148b. Thus, detailed description of the at least one film member 180 will be omitted for the sake of brevity.

Figure 17:
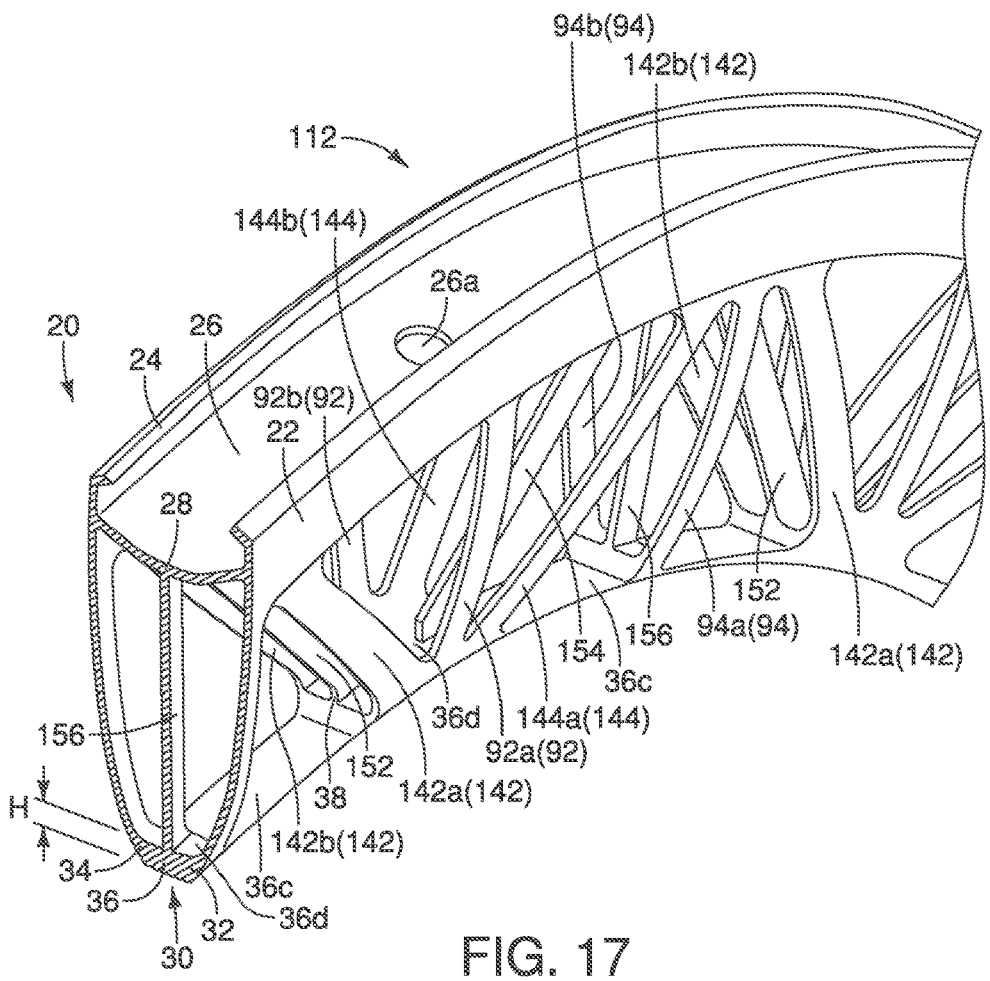
FIG. 17 is a further enlarged, partial perspective view of the bicycle rim illustrated in FIG. 13, in which an inner annual bridge further has concave portions, illustrating a radial cross section of the bicycle rim.

In this illustrated second embodiment, as shown in FIG. 15, the inner annular bridge 36 has a predetermined radial height H. However, as shown in FIG. 17, the inner annual bridge 36 further has concave portions 36c and support portions 366. In particular, the support portions 36d have the predetermined radial height and are connected by the intermediate members 150. The concave portions 36c are recessed in a radially inner direction with respect to the support portions 36d.

A process of manufacturing the bicycle rim 112 is basically identical to the process of manufacturing the bicycle rim 12 except that the straight members 90 is also formed during the cutting process, and the intermediate members 150 is formed so that the intermediate members 150 are aligned with the first slanting members 142, the second slanting members 144, and the straight members 90 as viewed in an axial direction A of the bicycle rim 112 during the cutting process. Thus, detailed description of the process of manufacturing the bicycle rim 112 will be omitted for the sake of brevity.

As explained above, the bicycle rim 112 has the intermediate members 150 radially extending between the radially outer peripheral part 20 and the radially inner peripheral part 30. Accordingly, with this arrangement, the bicycle rim 112 with improved reinforcement can be provided.

Third Embodiment

Figure 18:
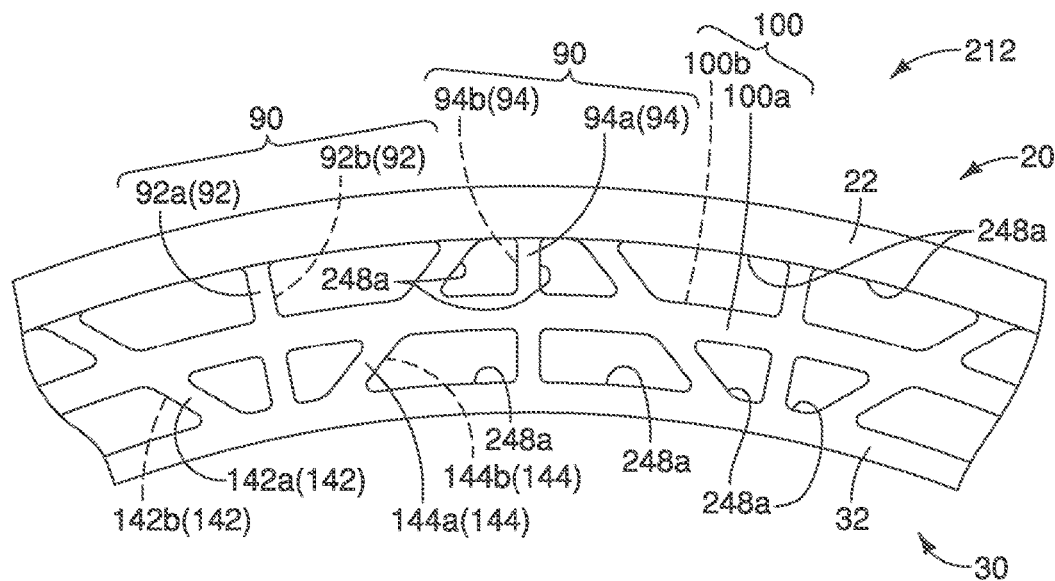
FIG. 18 is an enlarged, partial side elevational view of a bicycle rim in accordance with a third illustrated embodiment.
Figure 19:
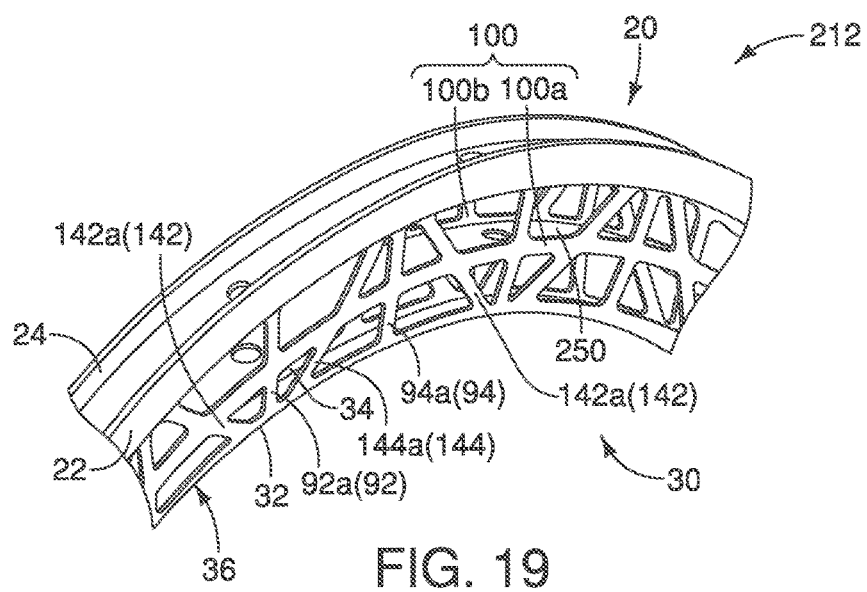
FIG. 19 is an enlarged, partial perspective view of the bicycle rim illustrated in FIG. 18.
Figure 20:
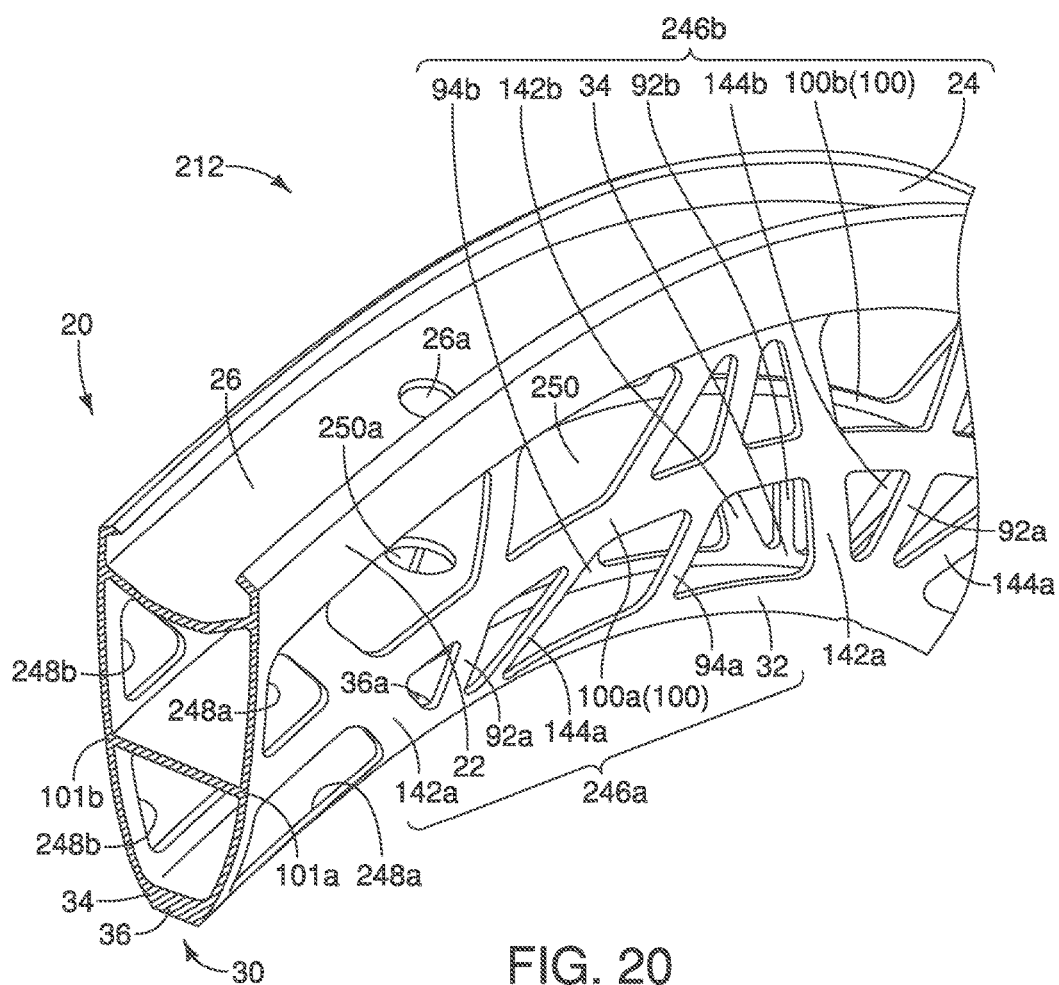
FIG. 20 is a further enlarged, partial perspective view of the bicycle rim illustrated in FIG. 18, illustrating a radial cross section of the bicycle rim.

Referring now to FIGS. 18 to 20, a bicycle rim 212 in accordance with a third embodiment will now be explained. The bicycle rim 212 is basically identical to the bicycle rim 112, except, for example, that bicycle rim 212 further includes a pair of a first beam member 100a and a second beam member 100b, and an intermediate member 250 that extends between the first beam member 100a and the second beam member 100b, as explained below.

In view of the similarity between the second and the third embodiments, the parts of the third embodiment that are identical to the parts of the second embodiment will be given the same reference numerals as the parts of the second embodiment. In any event, the descriptions of the parts of the third embodiment that are substantially identical to the parts of the second embodiment may be omitted for the sake of brevity. However, it will be apparent to those skilled in the art from this disclosure that the descriptions and illustrations of the first embodiment also apply to this third embodiment, except as discussed and/or illustrated herein.

The bicycle rim 212 includes the radially outer peripheral part 20, the radially inner peripheral part 30, the first slanting members 142, the second slanting members 144, and the straight members 90. In this illustrated third embodiment, the bicycle rim 212 further includes at least one beam member 100 and the intermediate member 250. The radially outer peripheral part 20, the radially inner peripheral part 30, the first slanting members 142, the second slanting members 144, the straight members 90, the at least one beam member 100, and the intermediate member 250 are integrally formed as a one piece, unitary member.

As shown in FIGS. 18 to 20, the at least one beam member 100 circumferentially extends across the first slanting members 142 (e.g., at least one first slanting member). The at least one beam member 100 includes a pair of the first beam member 100 *a* and the second beam member 100*b* (e.g., a pair of beam members), and the first beam member 100*a* and the second beam member 100*b* are disposed opposite relative to each other with respect to the axial direction A of the bicycle rim 12. Also, the first beam member 100*a* and the second beam member 100*b* are aligned with respect to each other as viewed in the axial direction A of the bicycle rim 212.

In particular, as best shown in FIG. 20, the first beam member 100*a* circumferentially extends across the first slanting members 142*a*, the first straight members 92*a*, the second slanting members 144*a*, and the second straight members 94*a* between the first outer annular side portion 22 and the first inner annular side portion 32. Likewise, the second beam member 100*b* circumferentially extends across the first slanting members 142*b*, the first straight members 92*b*, the second slanting members 144*b*, and the second straight members 94*b* between the second outer annular side portion 24 and the first second annular side portion 34. Preferably, the first beam member 100*a* and the second beam member 100*b* are disposed around the entire circumference of the bicycle rim 12. Of course, it will be apparent to those skilled in the art from this disclosure that the first beam member 100*a* and the second beam member 100*b* can be disposed partially around the entire circumference of the bicycle rim 12. As shown in FIG. 20, the first beam member 100*a* includes a radial middle portion 101*a* that is positioned in the middle of the first beam member 100*a* along the radial direction of the bicycle rim 212. Likewise, the second beam member 100*b* includes a radial middle portion 101*b* that is positioned in the middle of the second beam member 100*b* along the radial direction of the bicycle rim 212.

The intermediate member 250 (e.g., at least one intermediate member) extends between the first beam member 100*a* and the second beam member 100*b* in the axial direction A of the bicycle rim 212. Preferably, the intermediate member 250 contacts the first beam member 100*a* and the second beam member 100*b*. In particular, as best shown in FIG. 20, the intermediate member 250 extends between the radial middle portion 101*a* of the first beam member 100*a* and the radial middle porn on 101*b* of the second beam member 100*b* (e.g., radial middle portions of the beam members) in the axial direction A of the bicycle rim 212 so that the intermediate member 250 contacts both of the radial middle porn on 101*a* and the radial middle portion 101*b*. In the illustrated third embodiment, the intermediate member 250 preferably contacts both of the radial middle portion 101*a* and the radial middle portion 101*b*. The intermediate member 250 includes openings 250*a* for accessing and or mounting the spokes 16 in a conventional manner as needed and/or desired. Alternatively, intermediate member 250 can be free of any opening except for an outer single air valve mounting opening, which is used to mount an air valve 19 (see FIG. 1).

The bicycle rim 212 can be also explained as follows. In particular, the bicycle rim 212 includes the radially outer peripheral part 20, the radially inner peripheral part 30, the intermediate members 250, and a pair of a first side wall 246*a* and a second side wall 246*b* radially extending between the radially outer peripheral part 20 and the radially inner peripheral part 30. The first side wall 246*a* and the second side wall 246*b* have a plurality of first openings 248*a* and a plurality of second openings 248*b*, respectively.

As shown in FIG. 20, the first side wall 246*a* and the second side wall 246*b* are basically identical to the first side wall 146*a* and the second side wall 146*b* except that the first side wall 246*a* and the second side wall 246*b* are further formed of the beam members 100. Likewise, the first openings 248*a* and the second openings 248*b* are basically identical to the first openings 148*a* and the second openings 148*b* except that the first openings 248*a* and the second openings 248*b* are defined further by the beam members 100. Also, the first side wall 246*a* and the second side wall 246*b* are basically identical to the first side wall 146*a* and the second side wall 146*b* except that each of the first openings 248*a* and the second openings 248*b* has a triangle shape with three corners or a square shape with four corners.

In particular, the first side wall 246*a* is formed of the first outer annular side portion 22, the first inner annular side portion 32, the first slanting members 142*a*, the second slanting members 144*a*, the first straight members 92*a*, the second straight members 94*a*, and the first beam member 100*a*. Thus, the first openings 148*a* are defined by the first outer annular side portion 22, the first inner annular side portion 32, the first slanting members 142*a* or the second slanting members 144*a*, the first straight members 92*a* or the second straight members 94*a*, and the first beam member 100*a*. Likewise, the second side wall 246*b* is formed of the second outer annular side portion 24, the second inner annular side portion 34, the first slanting members 142*b*, the second slanting members 144*b*, the first straight members 92*b*, the second straight members 94*b*, and the second beam member 100*b*. Thus, the second openings 148*b* are defined by the second outer annular side portion 24, the second inner annular side portion 34, the first slanting members 142*b* or the second slanting members 144*b*, the first straight members 92*b* or the second straight members 94*b*, and the second beam member 100*b*.

The bicycle rim 212 preferably or optionally further includes at least one film member covering the first openings 248*a* and/or the second openings 248*b*. The at least one film member is basically identical to the at least one film member 180 except for that the film member covers the first openings 248*a* and the second openings 248*b*. Thus, detailed description of the at least one film member will be omitted for the sake of brevity.

A process of manufacturing the bicycle rim 212 is basically identical to the process of manufacturing the bicycle rim 112, except that an elongated metal member with a basic overall shape of the bicycle rim 212 having the intermediate member 250 that is extruded by the extrusion process is different from the basic overall shape of the bicycle rim 12, and at least one beam member 100 is further formed during the cutting process. Thus, detailed description of the process of manufacturing the bicycle rim 212 will be omitted for the sake of brevity.

As explained above, the bicycle rim 212 has the first and the second beam members 100*a* and 100*b*, and the intermediate members 250 radially extending between the first and the second beam members 100*a* and 100*b*. Accordingly, with this arrangement, the bicycle rim 212 with improved reinforcement can be provided.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. Also, the terms "part," "section," "portion," "member" or "element" when used in the singular can have the dual meaning of a single part or a plurality of parts.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa, unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rim comprising:
a radially outer peripheral part;
a radially inner peripheral part:
at least one side wall radially extending between the radially outer peripheral part and the radially inner peripheral part, the at least one side wall comprising at least one opening; and
at least one cover member covering the at least one opening, the at least one cover member comprising a metallic material,
the at least one opening including a plurality of openings, and
the cover member covering the plurality of openings.

2. The bicycle rim according to claim 1, wherein
the at least one side wall comprises a non-metallic material.

3. The bicycle rim according to claim 2, wherein.
the at least one side wall comprises a resin having carbon fibers or a fiber reinforced plastic.

4. The bicycle rim according to claim 1, wherein
the at least one side wall comprises an outer annular side portion, an inner annular side portion and at least one slanting member; and
the at least one opening is defined by the outer annular side portion, the inner annular side portion and the at least one slanting member.

5. The bicycle rim according to claim 4, wherein
the outer annular side portion, the inner annular side portion and the at least one slanting member are integrally formed as a single piece, and
each of the outer annular side portion, the inner annular side portion and the at least one slanting member comprises a non-metallic material.

6. Tice bicycle rim according to claim 4, wherein
the at least one cover member is adhered to the at least one slanting member.

7. The bicycle rim according to claim 1, wherein
the at least one cover member is an integral cover member that covers the plurality of openings.

8. The bicycle rim according to claim 1, wherein
the at least one cover member is adhered to the at least one side wall by bonding or sealing.

9. The bicycle rim according to claim 1, wherein
the at least one cover member comprises aluminum.

10. The bicycle rim according to claim 1, wherein
the radially inner peripheral part comprises a plurality of spoke openings; and
the at least one opening is positioned radially outwardly from the plurality of spoke openings.

11. The bicycle rim according to claim 1, wherein
the at least one side wall includes:
a first side wall including a first outer annular side portion, a first inner annular side portion and a first slanting member; and
a second side wall including a second outer annular side portion, a second inner annular side portion and a second slanting member,
the at least one opening includes:
a first opening defined by the first outer annular side portion, the first inner annular side portion and the first slanting member; and
a second opening defined by the second outer annular side portion, the second inner annular side portion and the second slanting member, and
the first slanting member is spaced apart from the second slanting member in an axial direction such that there is a gap between the first slanting member and the second slanting member.

12. The bicycle rim according to claim 1, wherein
the at least one cover member is a film.

13. A bicycle rim comprising:
a radially outer peripheral part;
a radially inner peripheral part;
at least one side wall radially extending between the radially outer peripheral part and the radially inner peripheral part, the at least one side wall comprising at least one opening; and
at least one cover member covering the at least one opening, the at least one cover member comprising a metallic material, wherein:
the at least one side wall includes:
a first side wall including a first outer annular side portion, a first inner annular side portion and a first slanting member; and a second side wall including a second outer annular side portion, a second inner annular side portion and a second slanting member, the at least one opening includes:
a first opening defined by the first outer annular side portion, the first inner annular side portion and the first slanting member; and
a second opening defined by the second outer annular side portion, the second inner annular side portion and the second slanting member, and the first slanting member is spaced apart from the second slanting member in an axial direction such that there is a gap between the first slanting member and the second slanting member.

14. A bicycle rim comprising:
a radially outer peripheral part:
a radially inner peripheral part;
at least one side wall radially extending between the radially outer peripheral part and the radially inner peripheral part, the at least one side wall comprising at least one opening; and
at least one cover member covering the at least one opening, the at least one cover member comprising a metallic material,
the at least one side wall comprising an outer annular side portion, an inner annular side portion and at least one slanting member; and
the at least one opening being defined by the outer annular side portion, the inner annular side portion and the at least one slanting member.

* * * * *